June 3, 1930.  J. ALEXANDER  1,761,767
ELECTRIC MOTOR
Filed Nov. 5, 1926
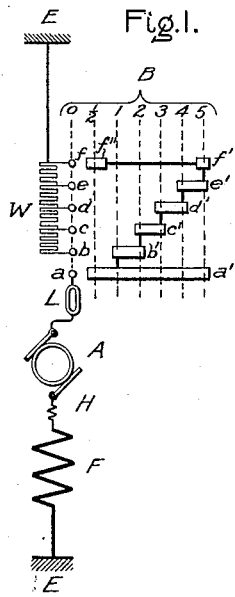
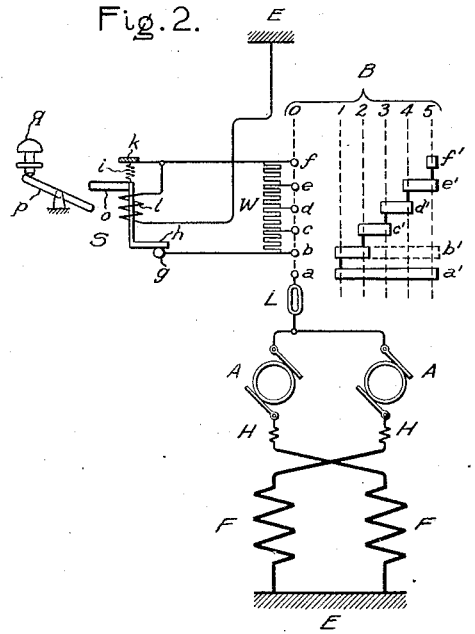
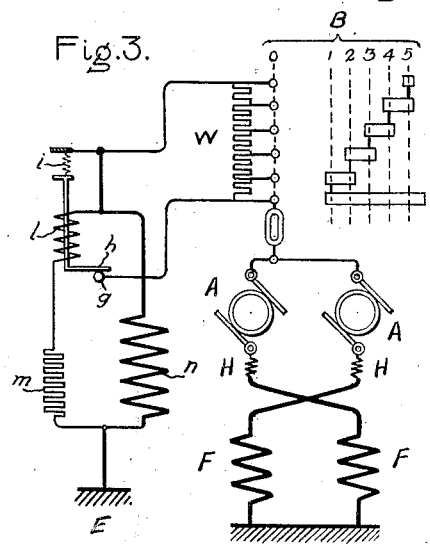
Inventor:
Johann Alexander.
by [signature]
His Attorney.

Patented June 3, 1930

1,761,767

UNITED STATES PATENT OFFICE

JOHANN ALEXANDER, OF BERLIN-ZEHLENDORF, GERMANY, ASSIGNOR TO GENERAL ELECTRIC COMPANY, A CORPORATION OF NEW YORK

ELECTRIC MOTOR

Application filed November 5, 1926, Serial No. 146,420, and in Germany November 14, 1925.

My invention refers to electric motors and more especially to means for braking series-wound direct current motors. It is an object of my invention to provide means whereby motors of the type aforesaid, especially those used for driving vehicles, can be braked in a particularly simple and efficient manner.

It has been proposed heretofore to connect series-wound direct current motors, such as are designed for use in vehicles for braking purposes in such a way that they operate as generators, and to supply the current into tapped resistances which are cut out step by step and finally short circuited. With the ordinary type of series wound motors arranged as self-excited generators, a certain time is required for the building up of the field excitation, the length of which depends upon various factors such as the speed, the amount of residual magnetism, the amount of the brush-contact-resistance, the amount of braking resistances and the manner in which the resistances are subdivided into sections. If the relation between these values is very unfavorable, it is quite likely that no self-excitation at all will be obtained.

According to the present invention prompt and effective action of the motors (arranged as generators) is insured by fully or approximately short-circuiting the motors directly at the beginning of the braking action in order to reduce as much as possible the delay in the development of the self-excitation action. In order to avoid the production of an excessive braking current and consequently an exaggerated jerky braking action, I interrupt the short-circuit of the motors during the period that the field excitation is building up and the braking current is increasing, i. e. before the current has reached an unduly high amount.

In the accompanying drawing Fig. 1 is a schematic circuit diagram showing the invention embodied in a hand-operated braking controller of the drum type; Fig. 2 is a schematic circuit diagram of a similar braking control provided with an automatic electro responsive switch for controlling the initial braking action; and Fig. 3 shows a modification of the automatic electroresponsive switch braking control of Fig. 2.

In all the figures A is the motor armature, H the auxiliary or commutating field coils, F the main field coils of a direct current series motor; B is the braking portion of a controller, W is the graduated variable braking resistance, L is the blow out coil of the controller, E are the grounded points of the circuit. Only those parts of the controller are shown which are of importance for a proper understanding of the braking procedure. Those parts of the controller which serve for driving purposes and also those parts which serve for connecting the motor and the resistances in the manner shown, viz, ready for braking, can be designed in any well known manner. The fixed contact fingers of the controller are marked by reference letters $a-f$ and the corresponding contact segments arranged on the controller cylinder are marked accordingly $a'-f'$. The segments $a'-f'$ are connected with each other in the well known manner shown in the drawing. The positions intended to be occupied by the controller cylinder with relation to the row of fingers, and in which the cylinder is stopped by the well known cam wheel and pawl action, are marked 0, 1, 2, 3, 4, 5, respectively. The position marked 0 is the off-position. In the following positions the sections of the braking resistances are short-circuited step by step and thereby cut out of the braking circuit in a well known manner.

According to my invention I add to these well known parts an intermediate switching segment marked $f''$ which is arranged and dimensioned to come into contact with the finger $f$ in an intermediate position of the cylinder between the positions 0 and 1. In the drawings this intermediate position is marked ½. By suitably shaping the cam wheel provision is made that the controller cylinder is not arrested in the ½ position, but is rapidly moved past it. The segment $a'$ is extended in the direction towards the row of fingers to such an extent that the finger $a$ and the segment $a'$ come into contact at the same time as finger $f$ and segment $f''$.

In this way the total braking resistance is short-circuited when the controller cylinder is in the intermediate position ½. This short-circuit is interrupted as soon as segment $f''$ passes out of contact with contact finger $f$. According to the present invention segment $b'$ is elongated towards the row of fingers to such an extent that it comes in contact with finger $b$ before finger $f$ and segment $f''$ have become disengaged, so that now, the braking current being already generated, braking is effected by short-circuiting the braking resistances step by step. By providing for a suitable length of segment $f''$ and a suitable position relative to finger $f$, I insure that the braking current is reliably generated but is prevented from reaching too great a value.

It may be advisable to insert on the controller cylinder between further positions of the controller, for instance between position 1 and position 2, a further additional segment corresponding in its action to segment $f''$, in order to ensure the generating of braking current in position 2 by a repeated impulse even at so low a speed that the voltage generated by the motor in position 1 of the controller is too small to keep up a braking current.

It is, however, important that the additional segments make contact with the corresponding fingers only in the intermediate positions and not in the arrested positions, so that the short-circuit takes place only temporarily and a stepwise braking action is obtained.

In the example illustrated in Fig. 2, two motors are shown cross-connected in a well known manner. Instead of segment $f''$ shown in Fig. 1 an automatic circuit breaker is provided which in its closed position short-circuits the resistance W. Switch S has a fixed contact piece $g$ and a movable contact piece $h$. The contact pieces are kept in engagement by an energy accumulating device, for instance a spring $i$ abutting against a fixed stop $k$. Switch S is controlled by the coil $l$ which is traversed by the braking current. The coil is so designed that it will open switch S against the action of the pressure spring $i$ at a predetermined value of the braking current.

The device operates as follows:

If the controller cylinder is placed in position 1, the braking circuit is kept short-circuited by switch S. The motors being wired up as generators are self-excited, which is done very quickly owing to their being short-circuited. As soon as the braking current has reached the value for which coil $l$ is proportioned, switch S will interrupt the short-circuit. If, after switch S has interrupted the short-circuit, the braking current—with the controller cylinder in position 1 does not reach such a value that coil $l$ continues to keep switch S opened, or in case that the driver should keep the controller cylinder too long in position 1, the braking current will decrease below the drop out value and switch S will close its contacts again. Switch S thus automatically produces further braking impulses if the driver fails to cause sufficient braking.

Finally the car is stopped by the repeated action of switch S, even if the driver should keep the controller continually in position 1. Furthermore, if the working of switch S is made audible or visible to the driver, he is also indirectly induced by this switch to increase the braking action. Also in the further braking positions of the controller cylinder switch S will start operating if the value of the braking current is insufficient. In this case it will not short-circuit the resistance W fully, but will connect a certain section of the braking resistance in shunt to that section of the resistance which is already comprised in the braking circuit. For instance, in position 3, in which finger $d$ is in contact with segment $d'$ and finger $c$ in contact with segment $c'$, that section $d$—$f$ of the braking resistance which is already connected by the contact segments of the controller cylinder into the braking circuit, is shunted by section $b$—$c$ of the braking resistance in consequence of the action of the automatic switch S, with the result that the braking current is augmented. If, however, as shown in dotted lines in Fig. 2, segment $b'$ is extended up to position 5, that section of the braking resistance which is contained in the braking circuit is fully short-circuited by the action of switch S. Instead of segment $b'$ another segment, for instance segment $c'$, may be extended up to position 5 in order that by further action of switch S the section of resistance included in the braking circuit may be shunted by section $b$—$c$ of the resistance, instead of being fully short-circuited.

In certain cases, for instance, if the car descends a slight slope, it may be desirable to maintain a feeble braking action and to prevent the switch S from increasing it. To meet these requirements it may be advisable to construct switch S in such a way that after having once started the braking action, it can be kept in its open position by means of any known locking mechanism controlled by the driver. Such locking mechanism is outlined by way of example in dotted lines in Fig. 2. It comprises the catch $o$ secured to the movable contact of switch S, the lever $p$ and the push button $q$. By pushing the button $q$ catch $o$, being designed in such a way that it passes the lever $p$ during the ascending movement of the movable part of switch S, is prevented from re-descending by lever *p*. Therefore switch S remains opened until the button is released.

In the arrangement illustrated in Fig. 2, the coil *l* of the switch S is traversed by the entire braking current; it may, however, also be arranged in a branch circuit in order to be traversed only by a branch current. This is shown for instance in Fig. 3, where S represents the automatic switch arranged to temporarily short-circuit the braking resistance, *l* being the overload coil of the switch, *m* an ohmic resistance connected in series with coil *l*, *n* a choking coil connected in parallel to coil *l* and resistance *m*. The time constant of this choking coil must be greater than that of the shunt circuit. In consequence of this branching a greater part of the current passes through coil *l* during the increasing period of the braking current than during the stationary state. Thereby switch S, in spite of the time required for the ascending movement will interrupt the circuit early enough to prevent the current from reaching an inadmissible value.

I wish it to be understood that I do not desire to be limited to the exact details of construction shown and described for obvious modifications will occur to a person skilled in the art.

I claim:—

1. Means for braking series-wound direct current motors comprising a stepped braking resistance, a controller operable through a series of positions for establishing a braking circuit for the motors through said resistance and then cutting out the resistance step by step, and means associated with the controller for temporarily short-circuiting said motors when the braking circuit is initially established.

2. Means for braking series-wound direct current motors comprising a controller for establishing the braking circuit, a stepped braking resistance connected to be inserted in the braking circuit and cut out step by step by said controller, and an automatic circuit breaker normally connected to short circuit said motors when said controller is operated to establish the braking circuit.

3. Means for braking series-wound direct current motors comprising a controller for establishing the braking circuit, a stepped braking resistance controlled thereby and connected to be inserted in the braking circuit and cut out step by step by said controller, and automatically operative means for temporarily short-circuiting said motors when the braking current is below a predetermined value.

4. Means for braking series-wound direct current motors comprising a controller for establishing the braking circuit, a stepped braking resistance connected to be inserted in the braking circuit and cut out by said controller, and an automatic circuit breaker for temporarily connecting the cut out portion of said resistance in shunt with the remainder when the braking current decreases below a predetermined value.

5. Means for braking series-wound direct current motors comprising a controller for establishing the braking circuit, a stepped braking resistance connected to be inserted in the braking circuit and short-circuited step by step by said controller, an automatic circuit breaker for independently short-circuiting said resistance, an energy accumulating device arranged to keep said circuit breaker in closed position and means for controlling said circuit breaker by the braking current in such manner that whenever the said current exceeds a predetermined limit, said circuit breaker is opened against the action of said energy accumulating device to place the short circuiting of said braking resistance under the control of said controller.

6. Means for braking series-wound direct current motors comprising a manual controller for establishing the braking circuit, a stepped braking resistance connected to be inserted in the braking circuit and short-circuited step by step by said controller, an automatic circuit breaker for independently short-circuiting said resistance, a spring arranged to keep said circuit breaker in closed position and means for controlling said circuit breaker by the braking current in such manner that whenever the said current exceeds a predetermined limit, said current breaker is opened against the action of said spring to place the short-circuiting of said braking resistance under the exclusive control of said controller.

7. Means for braking series-wound direct current motors comprising a controller for establishing the braking circuit, a stepped braking resistance connected to be inserted in the braking circuit and short-circuited step by step by said controller, an automatic circuit breaker normally connected to short-circuit all the steps of said resistance when the controller is operated to establish the braking circuit and having a winding for operating the circuit breaker to remove the said short circuit when the current exceeds a predetermined value, and means for locking said circuit-breaker in its open position.

In testimony whereof I affix my signature.

JOHANN ALEXANDER.